E. JUNG.
PERMANENT AIR GAUGE FOR PNEUMATIC TIRES.
APPLICATION FILED DEC. 20, 1920.

1,421,490. Patented July 4, 1922.

Inventor:
ERNST JUNG,
By Bakewell & Church
Attorneys.

UNITED STATES PATENT OFFICE.

ERNST JUNG, OF ST. LOUIS, MISSOURI.

PERMANENT AIR GAUGE FOR PNEUMATIC TIRES.

1,421,490.  Specification of Letters Patent.  Patented July 4, 1922.

Application filed December 20, 1920. Serial No. 431,998.

*To all whom it may concern:*

Be it known that I, ERNST JUNG, a citizen of the United States, residing at St. Louis, Missouri, have invented a certain new and useful Improvement in Permanent Air Gauges for Pneumatic Tires, of which the following is a full, clear, and exact description, such as will enable others skilled in the art to which it appertains to make and use the same.

This invention relates to air gauges of the kind that are adapted to be permanently mounted on the valve stem of the inner tube of a pneumatic tire.

The main object of my invention is to provide an efficient air gauge of simple design that will indicate at all times the air pressure of the tire on which it is permanently mounted, and which is so constructed that the hand or indicator of the pressure indicating means will not assume a false position during the operation of inflating the tire.

Another object is to provide a permanent air gauge than can be manufactured at a low cost, applied easily to the valve stem of a tire and which is of such construction that there is little liability of its getting out of order when it is in use. Other objects and desirable features of my invention will be hereinafter pointed out.

Figure 1 of the drawings is a side elevational view of a portion of a vehicle wheel provided with a pneumatic tire whose valve stem is equipped with an air gauge constructed in accordance with my invention.

Figure 1:
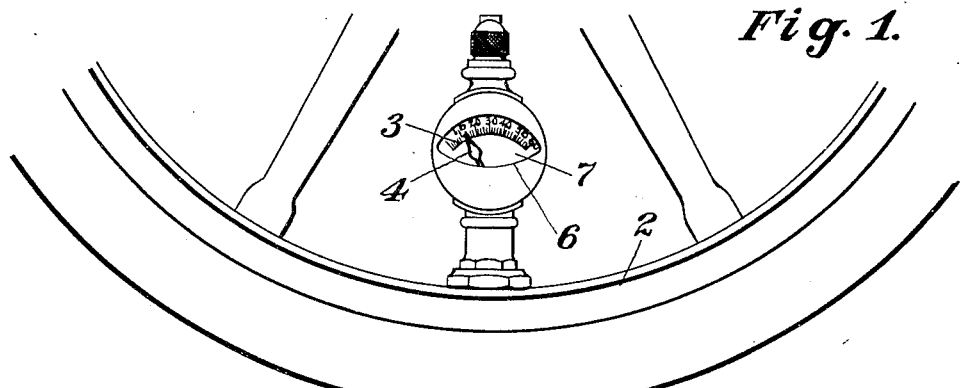

Referring to the drawings which illustrate the preferred form of my invention. A designates a pneumatic tire whose inner tube (not shown) is provided with a valve stem 1 of conventional form that projects inwardly through the felloe 2 of the wheel on which the tire is mounted. My improved gauge is adapted to be permanently mounted on the valve stem 1 and it comprises a visual air pressure indicating means, preferably a scale or graduated dial 3 that co-operates with a hand or indicator 4 and means for changing the position of one element of said pressure indicating means relatively to the other element as the pressure of the air in the inner tube of the tire varies. In the preferred form of my invention, as herein shown, the hand 4 moves in one direction over the dial 3 when the pressure of the air in the inner tube of the tire increases, and moves in the opposite direction over said dial when the pressure of the air in the inner tube diminishes. The means for actuating said hand preferably consists of a bent tube B of substantially C form in outline, having one of its ends closed and its opposite end open and arranged in such a manner that it will be in direct communication at all times with the interior of the inner tube of the tire, thus causing said tube B to expand or flex in one direction when the pressure of the air in the inner tube is increased and contract or flex in the opposite direction when the pressure of the air in the inner tube diminishes. Any suitable means may be employed for imparting movement from the bent tube B to the movable hand 4 of the air pressure indicating means, such, for example, as a link 5 pivotally connected to the hand 4 at one end and having its opposite end pivotally connected to the free end or closed end of the bent tube B.

Figure 2:
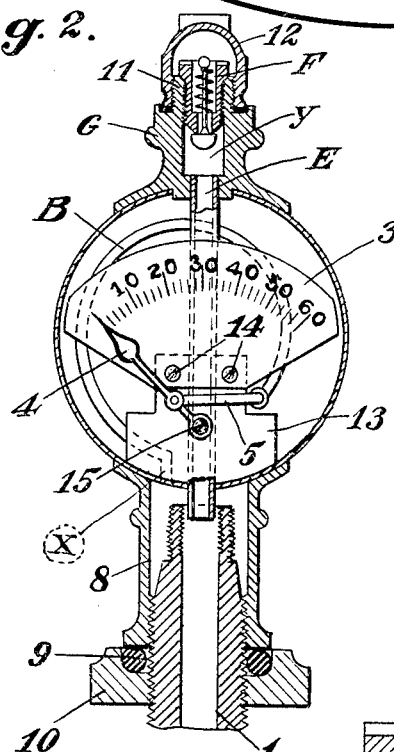
Figure 2 is a vertical sectional view of said gauge.

The dial 3 and hand 4 and the means B that actuates said hand are arranged inside of a housing D of any preferred form and construction which is provided with a sight opening 6, as shown in Figure 1, through which the dial 3 and hand 4 can be observed, the sight opening in said housing being covered with a piece of glass 7 or other suitable transparent material. The housing D herein illustrated is of substantially cylindrical form and an internally-screw-threaded sleeve 8 is connected to the lower side of said housing so as to mount said housing in operative position on the valve stem 1 of the inner tube of the tire, said sleeve 8 being adapted to be screwed downwardly over the valve stem 1 into engagement with a packing ring 9 arranged in a recess in the nut 10 on the valve stem that bears against the inner side of the felloe of the wheel. The sleeve 8 is of such length that the housing D will be held spaced away from the extreme upper end of the valve stem 1, as shown in Figure 2, and the bent tube B is so arranged that the open end $x$ of same terminates at a point on the underside of the housing D that is surrounded or inclosed by the sleeve 8. Accordingly, the open end of the tube B of the gauge will always be in direct communication with the interior of the inner tube of the tire.

Air is conducted into the inner tube of the tire preferably through an air supply pipe E arranged in vertical alignment with the valve stem 1 and provided at its upper end with a check valve indicated as an entirety by the reference character F and of the same or similar construction to the check valves now universally used in the valve stems of pneumatic tires. In the form of my invention herein illustrated the air supply pipe E extends vertically through the housing D with its lower end projecting into the air passageway of the valve stem 1 and with its upper end communicating with a valve chamber $y$ formed in a member G that carries the check valve F, said member G having an externally-screw-threaded, reduced portion 11 onto which a hose connection can be screwed when it is desired to inflate the inner tube of the tire or increase the pressure therein. Normally, a dust cap 12 is mounted on the reduced portion 11 of the member G so as to prevent dirt from entering the check valve F, said dust cap being of the same or similar form as the conventional dust cap now universally used on the valve stems of pneumatic tires.

Figure 3:
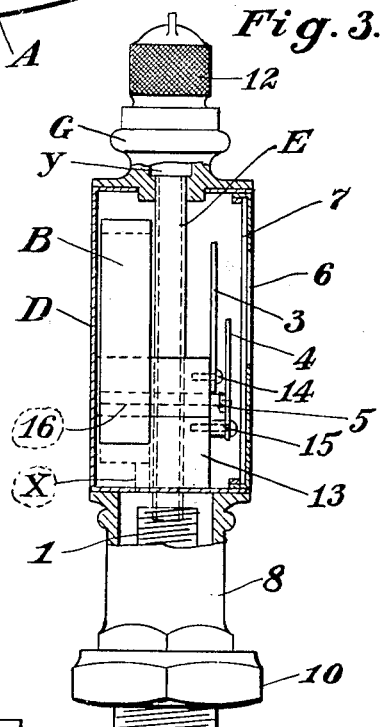
Figure 3 is a side elevational view of said gauge, partly broken away so as to more clearly illustrate the construction of same.
Figure 4:
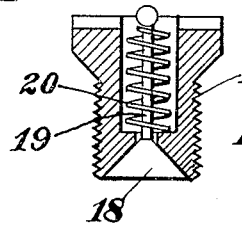
Figure 4 is a detail sectional view of another form of check valve that can be used in the air intake of the gauge.

One convenient way of mounting the bent tube B of the gauge and the dial 3 and hand 4 is herein illustrated and consists of a block 13 permanently mounted inside of the housing D at the lower side of same so as to form a support for the tube B, the dial 3, the hand 4 and the air supply pipe E. The dial 3 is rigidly connected to the supporting member 13 by screws or other suitable fastening devices 14 and the lower end of the hand 4 is pivotally connected at 15 to said supporting member 13. The lower end or stationary end of the bent tube B projects into a hole in the block 13 and is permanently connected to same, and a vertically-disposed hole $x$ is formed in the lower side of the housing D and in the portion of the block 13 to which the stationary end of the bent tube B is connected so as to form the air inlet or open end of the bent tube B. The member G that carries the check valve F is permanently connected to the upper side of the housing D and the air supply pipe E extends downwardly from the member G through the block 13 and through the lower side of the housing D. The bent tube B is preferably flat and is bent into substantially C form, as previously stated, and said tube is arranged between the rear wall of the housing D and the air supply pipe E, as shown in Figure 3, said bent tube being provided at its free end or closed end with a forwardly-projecting arm 16 (shown in dotted lines in Figure 3) to which the link 5 is pivotally connected. It is immaterial, so far as my broad idea is concerned, how the various parts or elements of the gauge are mounted and arranged, but it is essential that the air supply pipe E be of less cross-sectional area than the bore or air passageway of the valve stem 1 through which air is conducted into the inner tube of the tire, so as to insure the air flowing freely through the valve stem 1 during the operation of inflating the tire, for if the air supply pipe E were larger in cross-sectional area than the air passageway of the valve stem, there would be a tendency for the air to back up into the bent tube B during the operation of inflating the tire, and thus cause the tube B to expand and move the hand 4 in such a direction that it would indicate a greater pressure than really existed in the inner tube of the tire. When the air supply pipe E is made smaller than the bore of the valve stem, however, this cannot occur, and consequently, there is no liability of the gauge giving a false reading when the tire is being inflated. Another feature of my gauge which contributes to its accuracy is that the air inlet $x$ of the bent tube B is disposed approximately parallel with the air supply pipe E and is of less cross-sectional area than said pipe, so as to cause the inrushing air passing through the supply pipe E during the operation of inflating the tire to suck air out of the tube B, thus eliminating the possibility of air backing up into the tube B when the tire is being inflated or supplied with additional air. Any suitable type of check valve F may be used in the air intake of the gauge, but I prefer to use a check valve comprising a cage 17 screwed into the member G on the upper side of the housing D and equipped with a valve 18 of cone shape, convex shape or any other form provided with a stem 19 that co-operates with a spring 20 which normally holds the valve seated. A permanent air gauge of the construction above described will show at all times the air pressure that exists in the inner tube of the tire on which the gauge is used, owing to the fact that the interior of the inner tube is always in direct communication with the bent tube B of the gauge. When the pressure of the air in the inner tube diminishes the bent tube B will contract and thus move the hand 4 in a direction to indicate a lower pressure. When the tire is being inflated or when the pressure in the tire is being increased, the inflowing air passes freely through the supply pipe E and through the valve stem 1 without liability of backing up into the bent tube B and causing said tube to move the hand 4 into an improper position on the dial 3. As soon as the flow of air through the supply pipe E ceases the pressure that exists in the inner tube will be indicated accurately on the dial by the hand 4 with which the free end of the bent tube B is operatively connected.

My improved air gauge is inexpensive to manufacture; it can be applied quickly and easily to the valve stem of a tire and it is of such rugged design that there is little liability of its getting out of order when it is in use.

Having thus described my invention, what I claim as new and desire to secure by Letters Patent is:

An air gauge, comprising a closed housing provided with a sight opening, a dial and a co-operating movable indicator arranged inside of said housing in proximity to said sight opening, a tubular member on the underside of said housing that is adapted to be screwed onto the valve stem of a pneumatic tire, said tubular member being of such length that the housing will be spaced away from the extreme upper end of the valve stem, a hose connection on the upper side of said housing to which an air line can be connected, a check valve in said hose connection, an air inlet pipe extending downwardly from said check valve and arranged with its lower end projecting into the valve stem of the tire, and an actuating device for said movable indicator provided at one end with an air inlet arranged substantially parallel to the air inlet pipe through which air is supplied to the inner tube of the tire.

ERNST JUNG.